Feb, 23 , 1926.

G. W. HENRY, JR 1,574,391

TICKETING MACHINE

Filed Dec. 15, 1923    6 Sheets-Sheet 2

Inventor,—
George W. Henry, Jr
by his Attorneys

Feb. 23, 1926.

G. W. HENRY, JR 1,574,391

TICKETING MACHINE

Filed Dec. 15, 1923

Inventor.-
George W. Henry, Jr.
by his Attorneys.

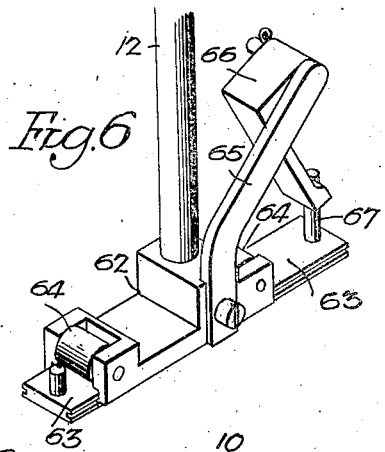
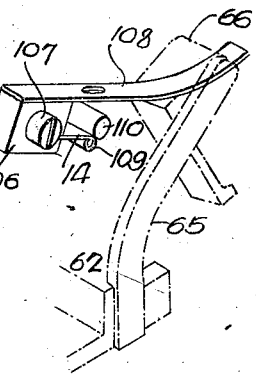
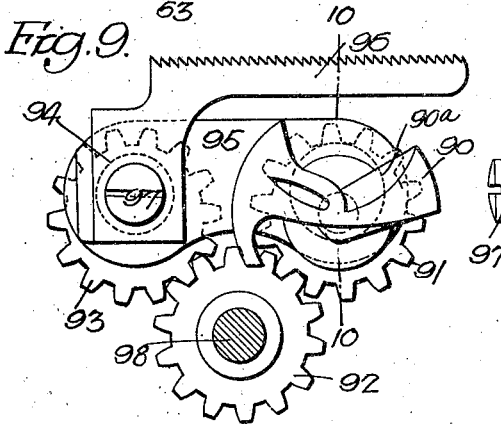
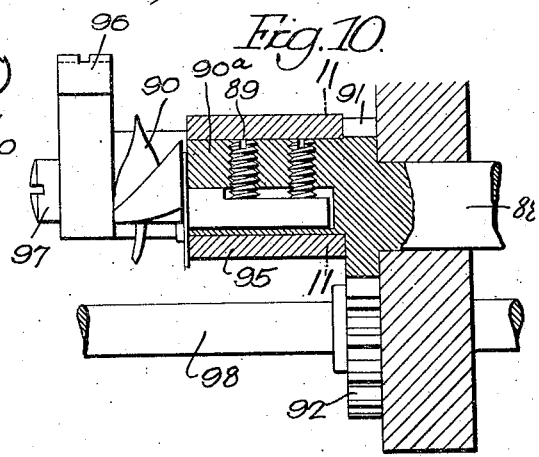
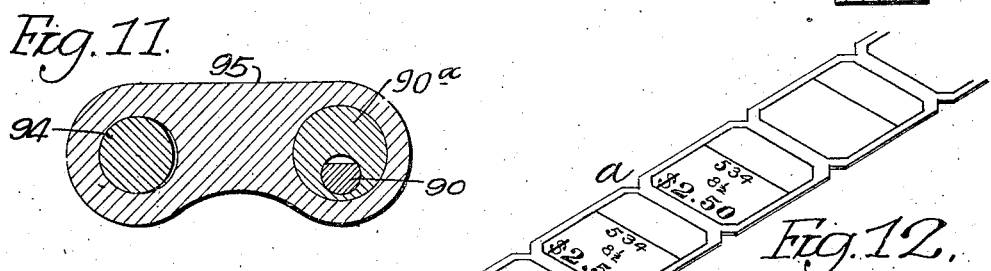
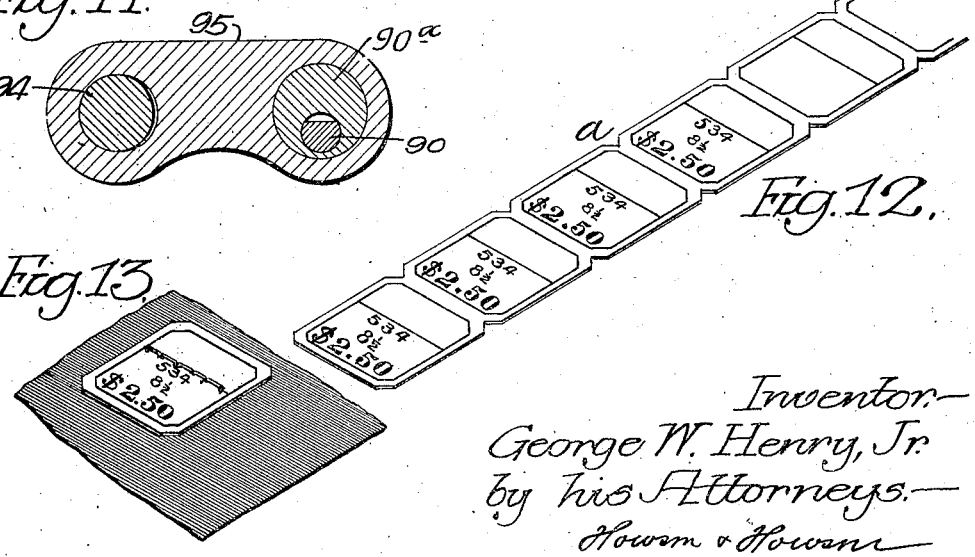
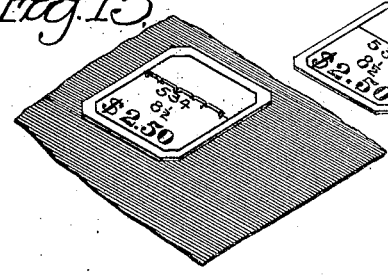

Patented Feb. 23, 1926.

1,574,391

UNITED STATES PATENT OFFICE.

GEORGE W. HENRY, JR., OF PHILADELPHIA, PENNSYLVANIA, ASSIGNOR TO SOABAR COMPANY, OF PHILADELPHIA, PENNSYLVANIA, A CORPORATION OF PENNSYLVANIA.

TICKETING MACHINE.

Application filed December 15, 1923. Serial No. 680,885.

*To all whom it may concern:*

Be it known that I, GEORGE W. HENRY, Jr., a citizen of the United States, residing in Philadelphia, Pennsylvania, have invented certain Improvements in Ticketing Machines, of which the following is a specification.

My invention relates to certain improvements in ticketing machines for which Letters Patent were granted to me on the 17th day of October, 1922, No. 1,432,554.

The object of my present invention is to improve the details of the mechanism for printing and cutting a ticket and for stitching a ticket to the material.

Figure 4:
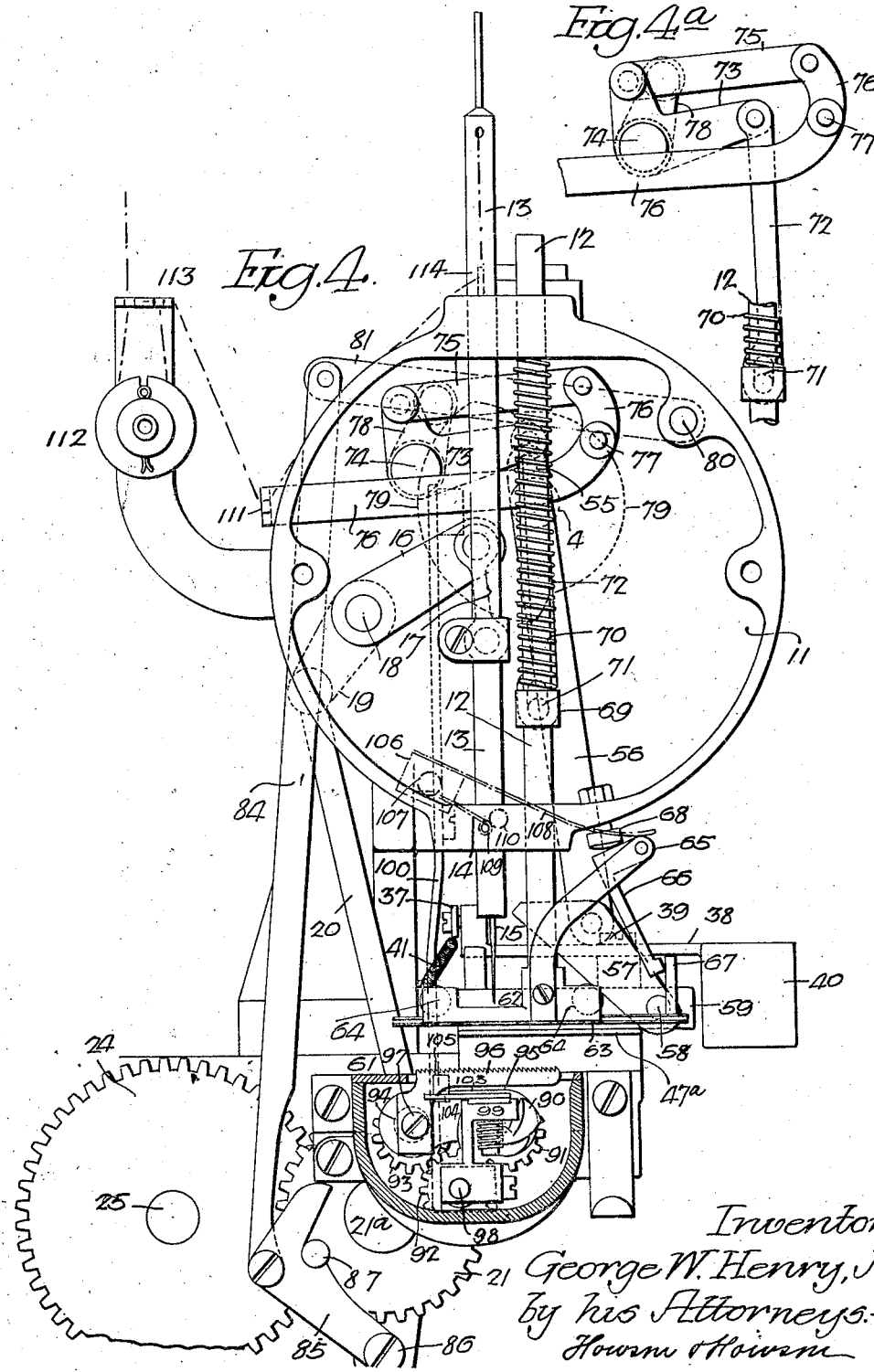
Fig. 4 is a front view of the machine.
Figure 5:
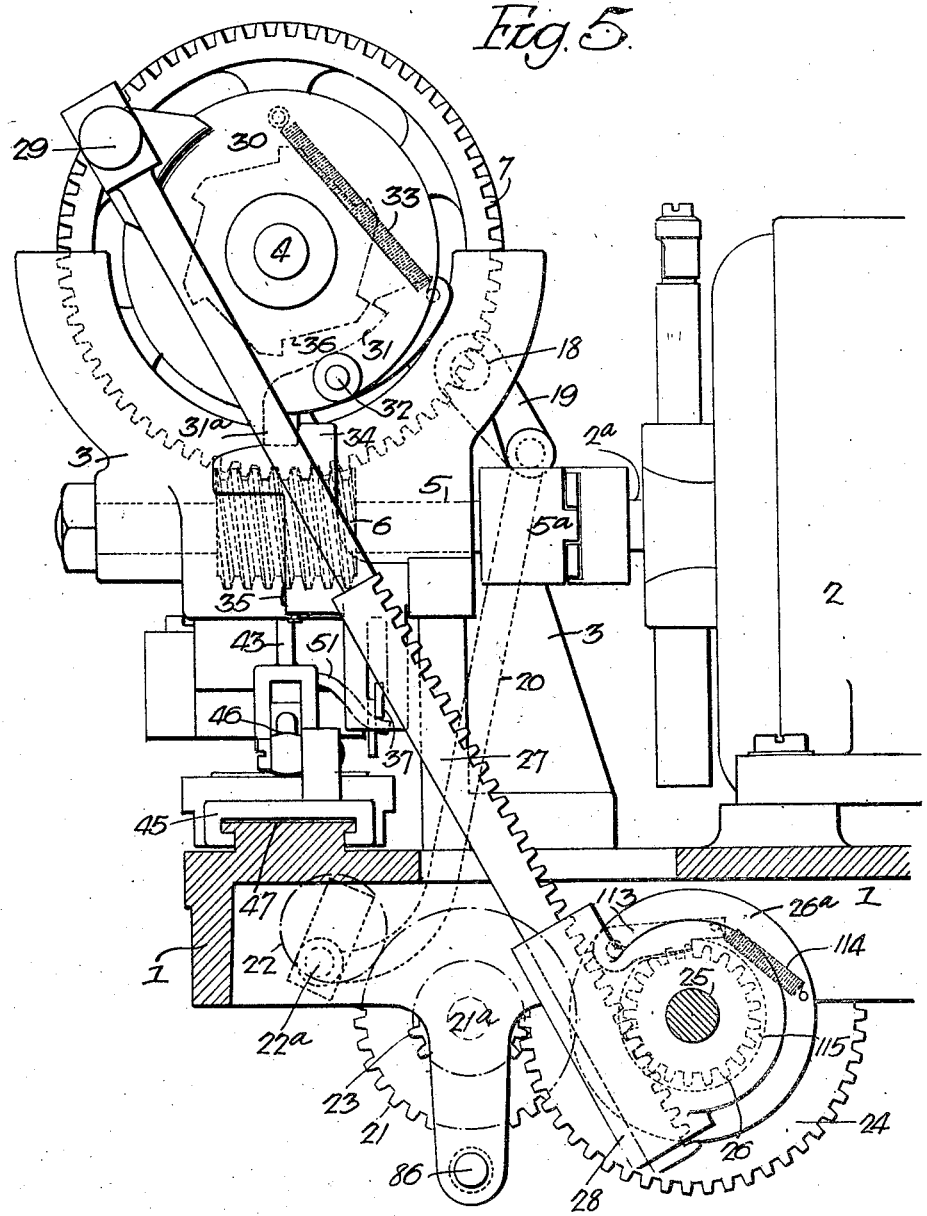

Fig. 4ᵃ is a detached view of the mechanism shown in Fig. 4;

Fig. 5 is a rear view;

Fig. 6 is a detached perspective view of the presser bar;

Fig. 7 is a detached plan view of the cutter;

Fig. 8 is a perspective view of the thread holder;

Fig. 9 is a front view showing the feed mechanism and looper;

Fig. 10 is a sectional view on the line 10—10, Fig. 9;

Fig. 11 is a sectional view on the line 11—11, Fig. 10;

Fig. 12 is a perspective view of a strip of tickets; and

Fig. 13 is a view showing a ticket stitched to a piece of fabric.

Referring to the drawings, 1 is the base of the machine. 2 is an electric motor that is mounted on the base. 3 is the main frame of the machine, which is also mounted on the base 1. 4 is a longitudinal cam shaft, which is mounted on the frame. 5 is a transverse shaft, which is connected to the motor shaft 2ᵃ by a coupling 5ᵃ. On the shaft 5 is a worm 6, which meshes with a worm wheel 7 that is mounted loosely on the cam shaft 4. 8 is a cam on the shaft 4, which actuates the slide. 9 is a face cam, which actuates the printing mechanism. 10 is a cam, which actuates the shears and the tension mechanism at the head of the machine.

Located in the head 11 at the front end of the frame 3 is the presser bar 12 and the needle bar 13. The two bars extend through the head, as shown in Fig. 4. Secured to the needle bar 13 is a needle 15. The needle bar is connected to an arm 16 by a link 17. The arm 16 is on a rock shaft 18 that has an arm 19, which is connected to an operating rod 20 that is attached to a pin 22ᵃ on a gear wheel 22, which meshes with a gear wheel 21 that is mounted on a stud 21ᵃ, on which is a pinion 23 that meshes with a gear wheel 24 on a shaft 25. This shaft 25 extends to the rear of the machine. On this shaft is a pinion 26 with which meshes the teeth of a rack bar 27, which is arranged to slide in a bearing 28 and is attached to a pin 29 on an arm of a disk 30.

The pinion 26 is loose on the shaft 25 and has a disk 26ᵃ secured thereto. On the disk is a pawl 113 that has a spring 114. This pawl engages a notched disk 115, which is secured to the shaft 25. By this construction, the shaft 25 is intermittently turned in one direction only.

On the disk 30 is a pawl 31, which is pivoted at 32. Attached to the pawl is a spring 33. The other end of the spring is secured to the disk, Fig. 5. On the pawl 31 is a heel 31ᵃ, which is arranged to come in contact with a stop 34, pivoted at 35 to the frame of the machine, and held in normal position by a spring 35ᵃ. The pawl 31 is arranged to engage the teeth of a ratchet wheel 36 on the worm wheel 7.

Figure 1:
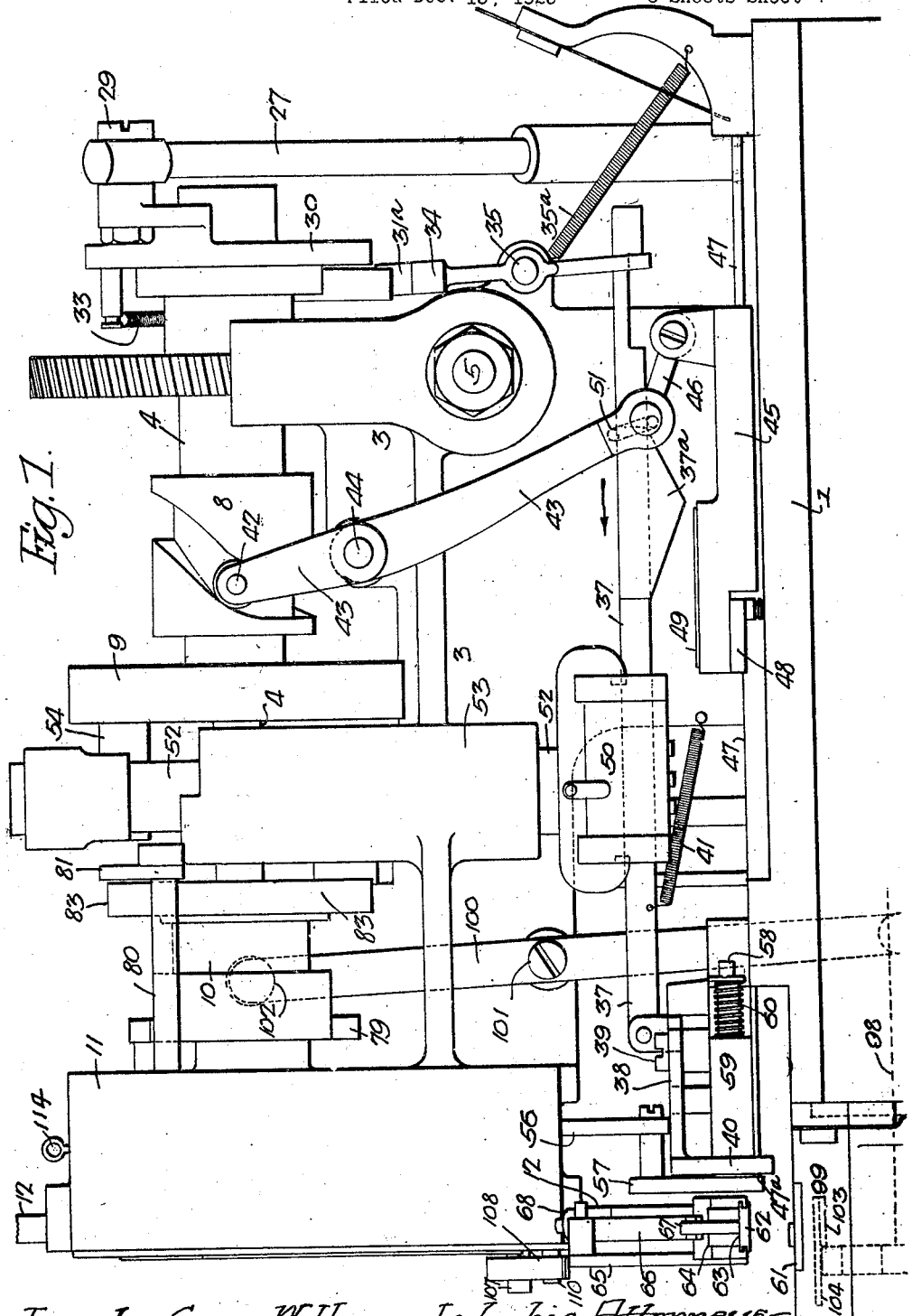
Fig. 1 is a side view of my improved ticketing machine.

The stop 34 is moved into and out of position by a rod 37, which extends throughout the length of the machine and is attached to an operating lever 38 at the front of the machine. This lever is pivoted to the frame at 39 and has a push pad 40. A spring 41 is connected to the rod 37 and to the frame and tends to hold the rod 37 and the stop 34 in the position shown in Fig. 1, the stop being in engagement with the pawl 31. When the lever 38 is pushed, the rod is moved in the direction of the arrow, Fig. 1, and turns the stop on its pivot—clear of the pawl—allowing the pawl to engage the ratchet wheel 36, giving motion to the parts of the machine.

When the disk makes a revolution, the heel 31ª of the pawl comes in contact with the stop 34, which returns to its normal position as soon as the operator releases the push lever. This stops the mechanism of the machine, which cannot start until the operator pushes the lever.

The cam 8, on the shaft 4, has a scroll slot into which extends a pin 42 on a lever 43, pivoted to the frame at 44. The lever 43 is connected to a slide 45 by a link 46. The slide is reciprocated by the cam 8 over a bed 47, on which the strip of tags $a$ is fed.

The tag strip $a$ is made as shown in Fig. 12 and has a series of notches at each side. On the slide 45 are pivoted dogs 48 that are shaped to enter the notches in the tag strip, feeding the strip forward as the slide is moved forward by its cam. On the slide is an inking pad 49, arranged to ink the type carried by the chase 50.

On the lever 43 is an arm 51, which extends under the bar 37. On the bar is a cam 37ª, under which the arm 51 travels as the slide moves forward. The arm 51 lifts the bar 37 out of engagement with the stop 34 and allows it to return to its normal position in the path of the pawl, should the operator fail to release the lever 38 in time.

The chase 50 is carried by a plunger 52, which is adapted to slide vertically in a bearing 53, which forms part of the frame 3. On the plunger is a pin 54 that extends into the groove of the face cam 9. The cams 8 and 9 are so timed that the type will be inked by the pad 49, after which the type will make an impression on the tag strip $a$, which is moved intermittently over the bed 47 by the slide 45.

The cam 10 on the shaft 4 actuates the mechanism for cutting the thread after a given number of stitches has been made to secure the tag to the material.

On the end of the shaft 4 is a crank 55 to which a rod 56 is pivoted. This rod is attached to a shear blade 57, which is secured to a pivot shaft 58 that extends through a bearing 59 on the frame. On the pivot shaft is a spring 60, which is located between the bearing and a sleeve on the shaft. This spring tends to keep the shear blade 57 in cutting contact with the end 47ª of the bed 47, over which the tag is intermittently fed, thereby insuring accurate cutting of each tag, Fig. 3.

Directly below the end of the bed 47 is the work plate 61, on which is placed the fabric, or other material, to which a tag is to be secured. The tag—after being cut from a strip—drops onto the material and is clamped thereon by a presser foot 62, which is shown raised in Figs. 3 and 4. The presser foot is secured to the lower end of the presser bar 12 and is made as shown in Fig. 6. The presser foot has a sliding plate 63, which is moved longitudinally as the fabric and the ticket are fed across the work plate 61. Rollers 64—on the presser foot—form bearings for the plate. On an arm 65 is a pivoted lever 66, which is moved by a pin 67 on the plate 63. When the presser foot is raised, the lever strikes a stop 68 on the head 11 and moves the plate back to its first position.

Figure 2:
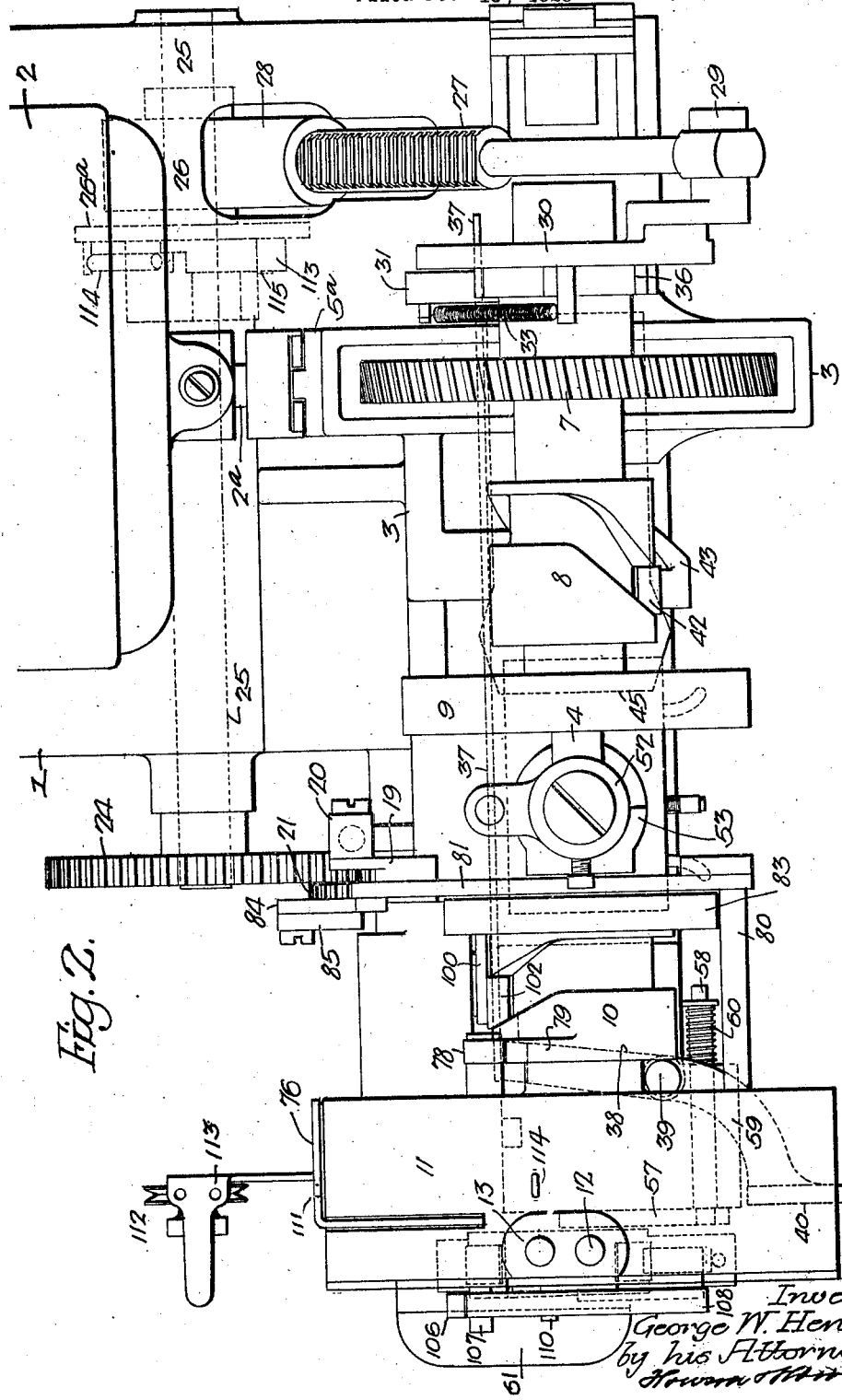
Fig. 2 is a plan view.

On the presser bar 12 is a collar 69, and between the collar and the top of the head 11 is a spring 70, which tends to hold the presser foot yieldingly to the work. On the collar is a pin 71 that extends into a slot in a rod 72, which is connected to one arm of a bell-crank lever 73, mounted on a shaft 74 in the head 11. The other arm of the lever is connected by a link 75 to a short arm of a lever 76, pivoted at 77. The lever extends through a slot in the head and is bent as shown in Fig. 2.

The lever 76 is a pulling device for the thread. At the end of the long arm of the lever 76 is an eye 111 through which the thread passes from the tension device 112 to the needle. When the presser foot is depressed by its spring, it raises the lever so that its eye is on a line between the two thread guides 113 and 114. This movement allows sufficient slack for the needle to make the stitches at once. When the stitches are completed and the presser foot is raised, the lever 76 is lowered to the position shown in Fig. 4, drawing the thread from the bobbin. The other end of the thread is held by the grip 109 and is also in the goods. After the above movement, the thread is cut by the shears.

On the shaft 74 is an arm 78, which has a roller riding upon the cam 79, forming part of the cam 10. Pivoted to a stud 80 on the back of the head 11 is an arm 81, having a roller 82 that extends into the groove of a cam 83, which forms an integral part of the cam 10 in the present instance.

Connected to the outer end of the arm 81 is a rod 84 that extends to a latch 85, which is pivoted at 86 to a projection on the base 1. This latch engages a pin 87 on the gear wheel 21 and stops its rotation at a given point. The cam 83 controls the movement of the latch so as to release the gear wheel at the proper time.

The gear wheel 22 is on a shaft 88 that extends forward and into the looper compartment, which is under the feed table 61. Secured to the end of the shaft by set screws 89 is the looper 90 of the ordinary construction, Figs. 9 and 10. On the shaft is an eccentric 90ª. Also on the shaft is a gear wheel 91, which meshes with an intermediate wheel 92, which, in turn, meshes with a gear wheel 93 that has an eccentric 94.

96 designates the feed bar that extends through a slot in the feed table 61. This bar is secured by a screw 97 in a feed bar carrier 95, which is mounted on both eccentrics. The eccentric 90ª raises and lowers the bar and moves it longitudinally and the eccentric 94 maintains the bar in a horizontal plane during this movement. A bar 98 extends through the intermediate wheel 92 and actuates the cutter 99. This bar is connected to one arm of a lever 100, which is pivoted to the frame at 101. The other arm of the lever has a pin 102 that extends into the groove of the cam 10.

Figure 3:
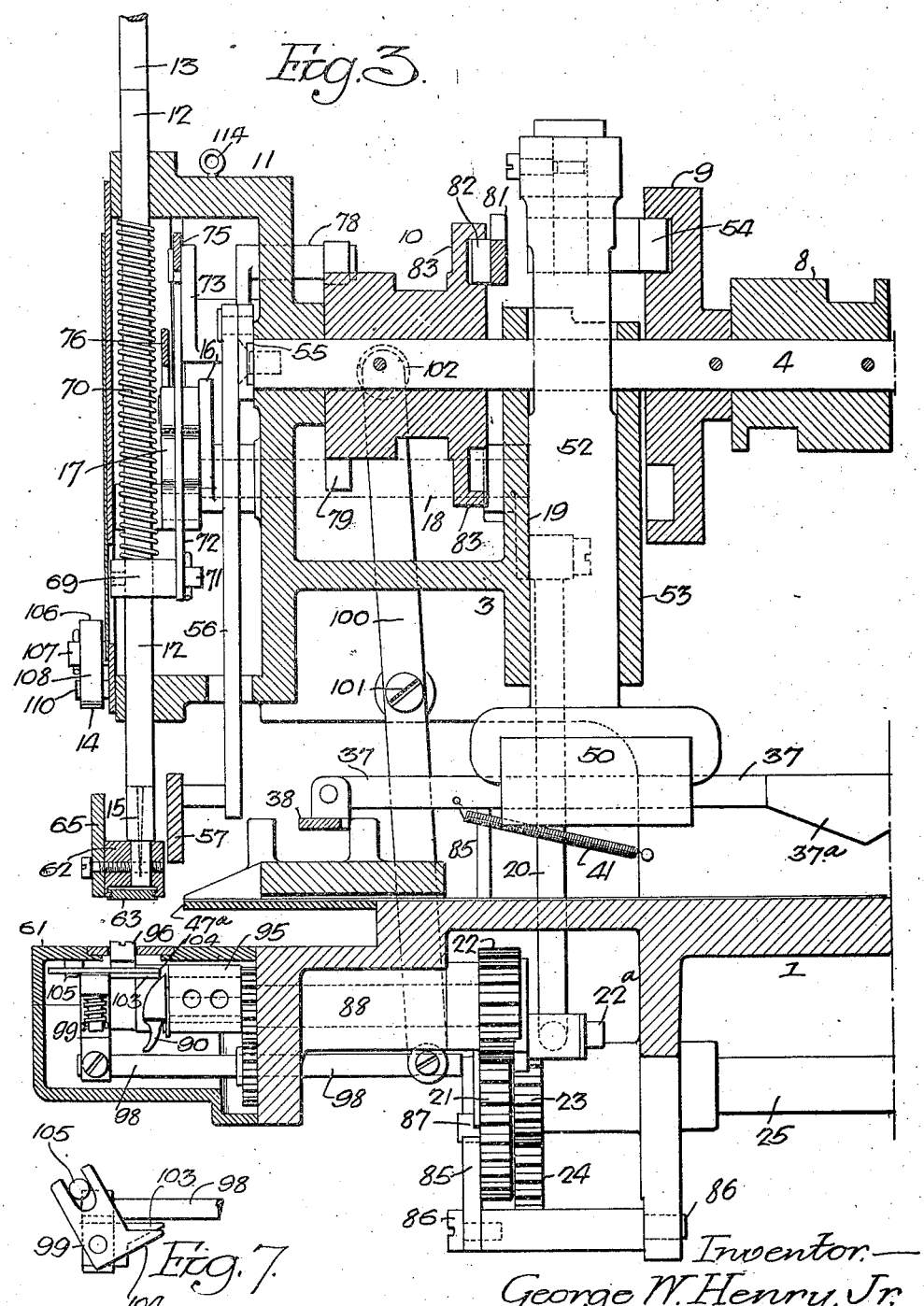
Fig. 3 is a longitudinal sectional view of one end of the machine.

The cutter 99 is illustrated in Figs. 3 and 7, and is in the form of shears. One blade 103 is mounted on the reciprocating rod 98 and the other blade 104 is pivoted to the blade 103, and is slotted to receive a fixed pin 105 that projects from the work plate. As the rod 98 is reciprocated, the cutter is moved bodily to and from the path of the thread. The blade opens as the cutter moves forward to clear the thread and cut it as the cutter returns.

The thread holder 14 is shown in Figs. 4 and 8. The body 106 of the holder is pivotally mounted on a pin 107, which projects from the front of the head 11 and has two arms. One arm 108 is long and is in the path of the lever 66, which is mounted pivotally on the presser foot. The other arm 109 is flexible and is opposite a pin 110 on the head 11. The thread passes between this arm and the pin, and, when the presser foot is raised, it turns the thread holder, causing the arm 109 to clamp the thread against the pin 110 and hold it after the cutter cuts the thread so that it will not be pulled out of the eye of the needle.

When the presser foot is lowered, the thread holder releases the thread so that the thread is free during the stitching operation.

The machine hereinbefore described feeds the tag strip, prints the tags, and cuts them from the strip. The material to be tagged is placed on the work plate and a tag drops onto it, after being cut from the strip. The presser foot is lowered and the needle and the looper make the necessary stitches to attach the tag to the material as the material and the tag are fed across the work plate. The thread is held and cut when the presser foot is raised automatically.

The material, with the tag attached thereto, is removed from the machine and the above operation is repeated.

The machine is started by pushing the lever 38 and is stopped automatically after each tag is sewed to its piece of material.

I claim:

1. The combination in a ticketing machine, of a bed; a reciprocating feeding device for feeding a strip of tickets over the bed; means for cutting a ticket from the strip; a work plate, on which the material in placed, a presser foot; feed mechanism and stitching mechanism; a slide mounted on the presser foot arranged to move with a ticket and the material during the stitching process; and means for returning the slide to its first position after a ticket has been secured to the material.

2. The combination in a ticketing machine, of a bed; a reciprocating feeding device for feeding a strip of tickets over the bed; means for cutting a ticket from the strip; a work plate at the end of the bed; a presser foot; feed mechanism and stitching mechanism; a sliding plate on the presser foot; rollers on the presser foot under which the plate slides; a pin on the plate; a lever, carried by the presser foot, acting to return the plate when the presser foot is raised; and a stop against which the lever strikes.

3. The combination in a ticketing machine, of a bed; a reciprocating feeding device for feeding a strip of tickets over the bed; means for cutting a ticket from the strip; a work plate at the end of the bed; a presser foot; feed mechanism for the material and the tag; a needle bar having a needle; a device, actuated by the presser foot, for holding the thread after it has been cut; a looper for the thread; and means for cutting the thread after a number of stitches has been made.

GEORGE W. HENRY, Jr.